April 28, 1959 A. R. GARFINKEL 2,884,615

PULSE CODED SIGNAL SEPARATOR

Filed Feb. 12, 1957 3 Sheets-Sheet 1

INVENTOR
ALAN R. GARFINKEL
BY Victor D Borst
ATTORNEY

April 28, 1959 A. R. GARFINKEL 2,884,615

PULSE CODED SIGNAL SEPARATOR

Filed Feb. 12, 1957 3 Sheets-Sheet 2

April 28, 1959 A. R. GARFINKEL 2,884,615

PULSE CODED SIGNAL SEPARATOR

Filed Feb. 12, 1957 3 Sheets-Sheet 3

INVENTOR
ALAN R. GARFINKEL 2,884,615

PULSE CODED SIGNAL SEPARATOR

Alan R. Garfinkel, Forest Hills, N.Y., assignor to Sperry Rand Corporation, Ford Instrument Company Division, Long Island City, N.Y., a corporation of Delaware Application February 12, 1957, Serial No. 639,751

5 Claims. (Cl. 340—147)

This invention relates to single channel telemetering systems and in particular to a device for the resolution of interspersed and interfering signals transmitted from a plurality of closely spaced aircraft to a data reception center.

In the present state of the electronic art, data transmission systems have utilized delay lines, pulse width discriminators and differentiation techniques for the resolution of two or more interfering trains of binary signals which are in the same channel. Such expedients usually have the fault of introducing errors into the interspersed codes which instill doubts and lack of confidence in the reliability of the system. In general, delay lines of realistic size have an inherently low order of transmissional bandwidth, this characteristic being a direct contributory influence to poor resolution. Pulse width discriminators which operate upon individual pulses without regard for the entire train often convey erroneous signal codes. Specifically, errors occur when the bracket pulses for two interspersed codes are clear and one or more of the pulses within the two trains are overlapping. The bracket pulses are the first and last pulses of a code which are selectively timed for signifying the start and finish of each code. For this condition, the rejection of the overlapped pulses would introduce errors into both codes.

A principal object of this invention is to furnish equipment for improving the separation of interspersed codes by selectively enabling individual channels to receive only one train of intelligence.

Another object of this invention in connection with unscrambling the interspersed codes is to improve the rejection of noise signals which can be mistaken for intelligence.

Still another object of this invention is to reject entire codes in which pulses are so completely overlapped that resolution is impossible.

As presently contemplated in this invention, there is provided a strobe clock or clock pulse generator circuit for each of the interspersed trains of binary signal trains. The strobe clock circuit generates a narrow pulse at the regular pulse intervals corresponding to the expected time positions of the component code pulses. The input channel to each code separation circuit is gated by the strobe clock circuits and the interspersed codes are separated in individual circuits by the required coincidence of the clock and code signals in each gate. The strobe clock circuit actuates a stepping register where the information is stored and stepped in synchronism with the associated strobe circuit. When a bracket coincidence is obtained, the codes are read out of the register for required data processing in other equipment. In the embodiment of the invention chosen for illustration, means are provided to reject spurious noise signals, to reject codes which are so completely overlapping that resolution is impossible and to disable each of the code separation circuits during the interval of time when the other code separation channels are receiving and storing intelligence.

The features and other objects of the invention will be understood more clearly from the following detailed description taken in conjunction with the accompanying drawings in which.

Figure 1:
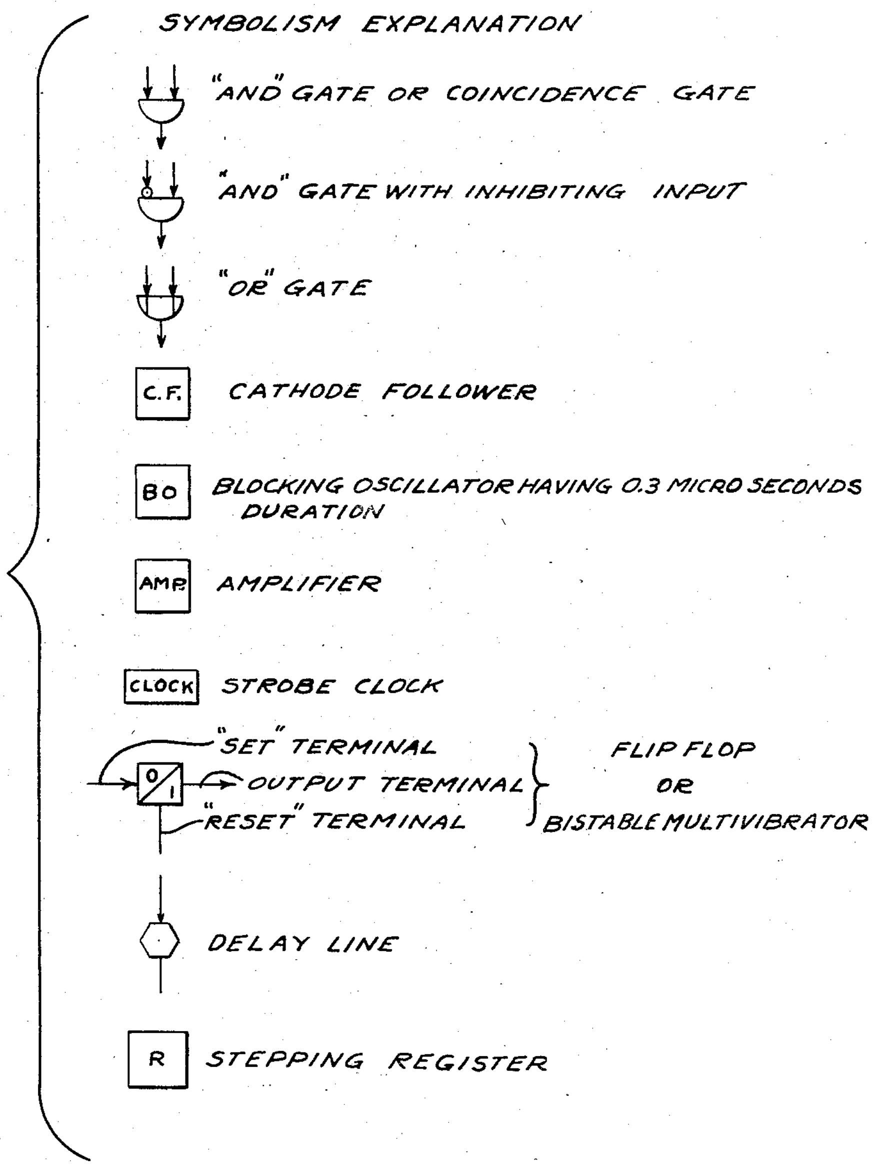
Fig. 1 is a schedule of symbolism employed in the disclosure of the invention and its embodiments.
Figure 2:
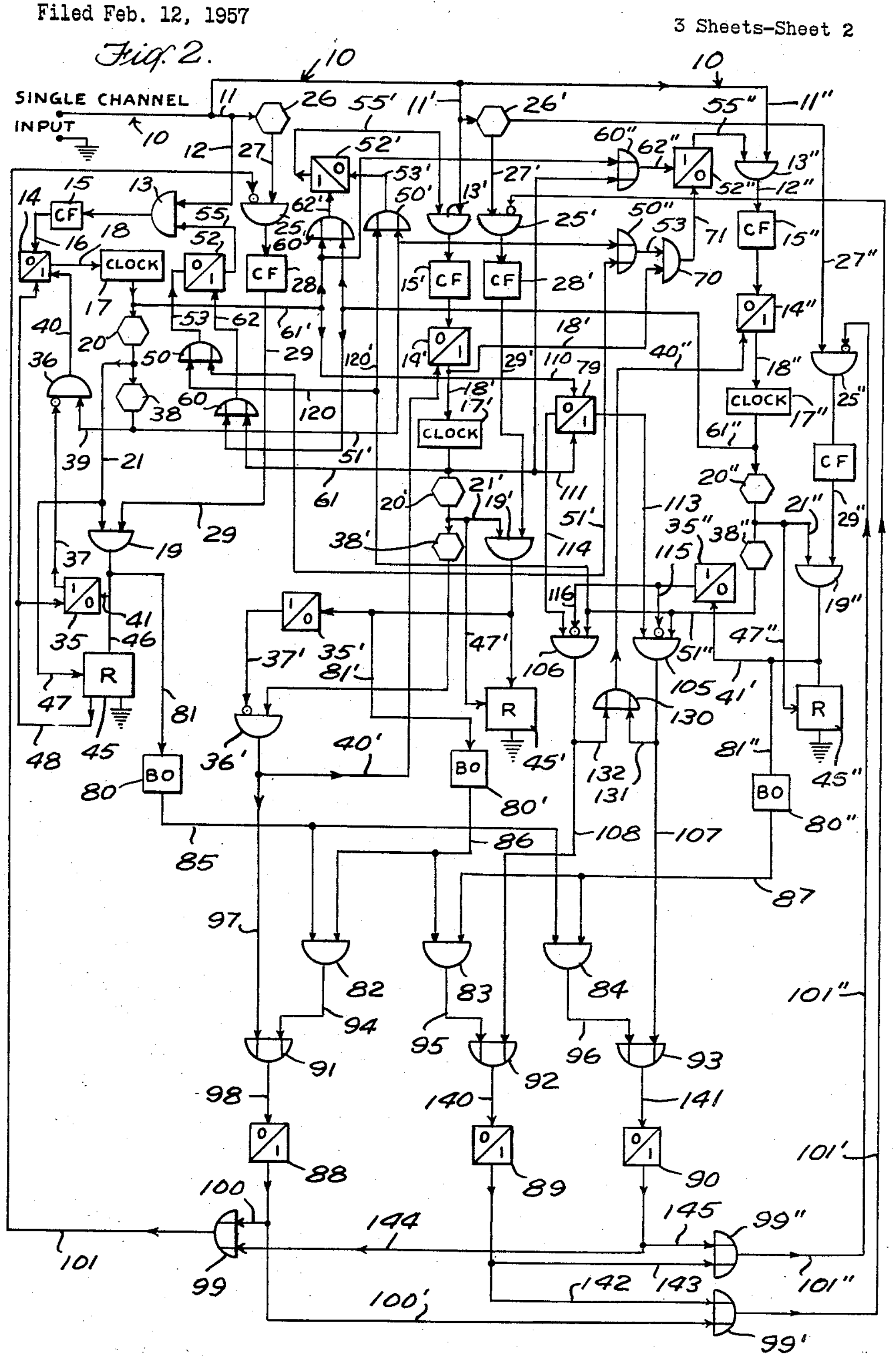
Fig. 2 is a block diagram of a single channel signal separator for accommodating three interspersed binary signal codes.
Figure 3:
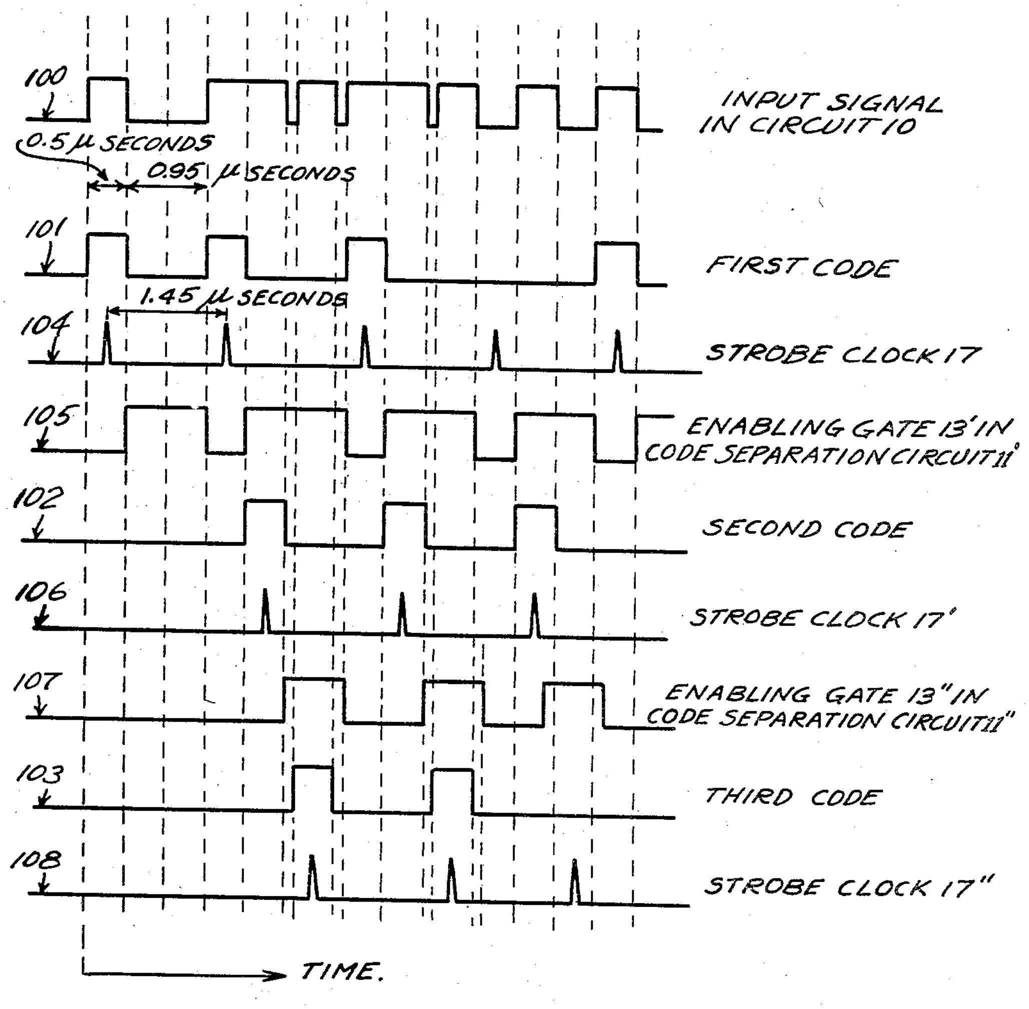
Fig. 3 is a diagram showing the relationship of the three signal codes, the pulsing of the three strobe clocks and the gating of the code separation circuits.

Referring to the block diagram of the binary signal separator for three codes in Fig. 2, an input circuit 10 is adapted to receive individual codes which may be interspersed. A first code separation circuit 11 is connected to the input circuit 10 to receive the first input pulse. A cable 12 connects the first separation circuit 11 to one input of an "and" gate 13, the output of this gate being connected to the "set" terminal of a flip-flop 14 through a cathode follower 15 by a cable 16. When "and" gate 13 is in an "open state" under the conditions to be explained later, the first pulse in the input circuit 10 sets flip-flop 14. The output of the flip-flop 14 is connected to and starts a strobe clock or clock pulse generator 17 through a cable 18. The output of the strobe clock 17 is connected to one input of a coincidence gate 19 through a delay line 20 by a cable 21. As an aid in explaining the cofunctioning of the circuit elements in this disclosure, it will be assumed that the incoming signal in circuit 10 has the form as represented in Fig. 3 by the curve 100 which is a composite of three codes individually represented by curves 101, 102 and 103, the codes comprising pulses of 0.5 microsecond (0.5 μsec.) pulse width and 1.45 μsec. pulse interval from leading edge to leading edge. Delay line 20 has a selected delay of 0.25 μsec. so as to oblige the sampling of "and" gate 19 at the center of the first pulse of the first code. Strobe clock 17 has a pulse interval of 1.45 μsec. as shown in curve 104. One input of an "and" gate 25 is connected through a delay line 26 to code separation circuit 11 by a cable 27, the delay line 26 introducing a delay to compensate for the starting lag of strobe clock 17. The output of "and" gate 25 is connected to the other input terminal of the coincidence gate 19 through a cathode follower 28 by a cable 29. If the first received pulse by the code separation circuit 11 is a noise signal or any spurious signal having a pulse width narrower than approximately 0.3 microsecond, there will be no coincidence of signals in the two inputs to the coincidence gate 19 and a flip-flop 35 connected to the output of the coincidence gate 19 by a cable 41 will not be set. The output of flip-flop 35 is connected to the inhibiting input of an "and" gate 36 by a cable 37. A delay line 38 having a 0.25 μsec. delay is connected between the cable 21 and the other input of "and" gate 36 by a cable 39. The output of "and" gate 36 is connected to the reset terminal of flip-flop 14 by a cable 40. When the first received signal by the first code separation circuit 11 is a noise or similar narrow spurious signal, flip-flop 35 will not set and the first clock pulse in cable 21, delayed an additional 0.25 μsec. in delay line 38 will reset flip-flop 14 through "and" gate 36 and thereby turn off the strobe clock 17.

If the strobe clock pulse successfully gates with the first pulse from the input circuit 10, the flip-flop 35 is set and the strobe clock 17 is prevented from turning itself off. The strobe clock will then pulse at the center of each time interval where a signal from this pulse train may appear as shown by curve 104 in Fig. 3. When there is a signal pulse where it is expected, the signal train output from the coincidence gate 19 is transferred to a stepping register 45 by a cable connection 46 therebetween, the stepping register being synchronized with the strobe clock 17 by a cable 47. When a "bracket coincidence" is obtained through a coincidence of "bracket pulses" in the positions 1 and 15 of the register 45, the binary code intelligence is read out of the stepping register 45 by circuitry (not shown). At "bracket coincidence," flip-flops 14 and 35 are reset through cable connection 48 and the stepping register 45 is cleared. Additionally flip-flop 14 turns off strobe clock 17. For rejecting faulty codes, a sixteenth step is provided in the stepping register for receiving the first pulse approximately 21.75 μsec. after it first appears, and the output of the sixteenth step through cable 48 resets the flip-flops 14 and 35, stops the strobe clock 17 and clears the register 45. The operation of the code separation circuit 11 as described is premised on the condition that the strobe clock 17 is enabled by "and" gate 13 being open. Hence, if the first pulse reaches tap 16, the entire faulty code is rejected from the remainder of the system.

The second code separation circuit 11′ and the third code separation circuit 11″ are connected across the input circuit 10 and each has identical circuit elements as the first code separation circuit 11 except as mentioned hereinafter. In order to simplify the understanding of the complete three code separator disclosed in Fig. 2, like reference numbers will be used for the code separation circuits of the second and third interspersed binary codes as was used for the first code circuit with the addition of a prime mark (′) for the elements of the second code separation circuit and a double prime mark (″) for the elements of the third code separation circuit.

One input of an "or" gate 50′ is connected to the cable 39 by a cable 51′, the output of the gate being connected to the "set" terminal of a flip-flop 52′ by a cable 53′. The output of flip-flop 52′ is connected to one input of an "and" gate 13′ by a cable 55′. The direct output of the strobe clock 17 is connected to one input of an "or" gate 60′ by a cable 61′, the output of this gate being connected to the "reset" terminal of flip-flop 52′ by a cable 62′. The pulse from the strobe clock 17 delayed 0.5 μsec. by the delay lines 20 and 38 sets the flip-flop 52′ and the next undelayed clock pulses resets this flip-flop. Thus, flip-flop 52′ enables the gate 13′ on the second code separation circuit 11′ as shown by curve 105 in Fig. 3 in order to set flip-flop 14′ and start the strobe clock 17′ as represented by curve 106. In essence, the second code separation circuit 11′ receives signal trains from the input circuit 10 and stores them in its stepping register 45′ whenever a pulse from the first code is not expected. If such a pulse is received, and it is longer than 0.3 μsec., clock 17′ strobes out the second code as shown in Fig. 3.

The third code separation circuit 11″ operates in the same manner as the first and second code separation circuits 11 and 11′, respectively, except that its flip-flop 52″ disables code separation circuit 11″ when a pulse from either the first or second codes are expected as shown by curve 107 in Fig. 3. An additional "and" gate 70 is connected between the output of the "or" gate 50″ and the input to the strobe clock 17′ for controlling the input to the "set" terminal of flip-flop 52″ by a cable 71 so that circuit 11″ cannot operate until circuit 11′ has been activated. The strobe clock 17″ in the third separation circuit 11″ is pulsed as represented by the curve 108 in Fig. 3.

Circuit elements 52, 50 and 60 in the first code separation circuit 11 corresponding to similar elements in the second and third code separation circuits 11′ and 11″ disable the first code separation when the second and third codes are expected.

In addition to discriminating against narrow pulses in their respective code separation circuits, flip-flops 35′ and 35″ in combination with a flip-flop 79 effect the rejection of any two codes which overlap to the extent that resolution is impossible. Blocking oscillators 80, 80′ and 80″, each oscillator having a pulse width of 0.3 μsec., are connected to the output of the "and" gates 19, 19′ and 19″ by cables 81, 81′ and 81″, respectively, so that each time a strobe clock pulse successfully gates with a code pulse, it fires a blocking oscillator. The outputs of the blocking oscillators on each code separation circuits are compared by pairs through three "and" gates 82, 83 and 84; viz, the output of blocking oscillator 80 is connected to one input terminal of gates 82 and 84 by a cable 85, the output of blocking oscillator 80′ is connected to one input terminal of gates 82 and 83 by a cable 86 and the output of blocking oscillator 80″ is connected to one input terminal of gates 83 and 84 by a cable 87. If any of the gates 82, 83 or 84 yield an output, it signifies that two strobe clocks are operating with insufficient time interval separation and the two offending codes associated with these strobe clock circuits must be rejected in their entirety. This rejection is effected by flip-flops 88, 89 and 90 which gate off the offending code separation circuits but allow their respective clocks to continue to operate. The operation of these clocks are permitted to continue so that the two code separation circuits can be safely reset after the offending codes are rejected, the rejection being completed when the first input pulse in each code has stepped to position 16 of the associated register. The specific circuitry to accomplish the desired result will now be detailed. The output of gates 82, 83 and 84 are connected to one terminal of "or" gates 91, 92 and 93 by cables 94, 95 and 96, respectively. The other input terminal of gate 91 is connected to the output of gate 36′ by a cable 97 and the output of the gate 91 is connected to the "set" terminal of the flip-flop 88 by a cable 98. The output of flip-flop 88 is connected to an "or" gate 99 by a cable 100 and to an "or" gate 99′ by a cable 100′. The output sides of gates 99 and 99′ are connected to the inhibiting input terminals of the gates 25 and 25′ by cables 101 and 101′, respectively. Thus if the strobe clocks 17 and 17′ in the first and second code separation circuits generate pulses within any 0.3 μsec. time interval, the flip-flop 88 will disable the incoming signals to the gates 25 and 25′ in these circuits.

To turn off the offending pair of code separation circuits when the third code is too greatly interspersed with either the first or second code, three legged gates 105 and 106 with inhibiting inputs are provided to perform the proper rejection, the other input side of the gates 93 and 92 being connected to the outputs of gates 105 and 106 by cables 107 and 108, respectively. The output of strobe clock 17 is connected to the "set" terminal of flip-flop 79 by a cable 110 while the output of strobe clock 17′ is connected to the "reset" terminal of flip-flop 79 by cable 111. The "set" output of flip-flop 79 is connected to one input of the gate 105 by a cable 113 and its "reset" output is connected to one input of the gate 106 by a cable 114. The inhibited input terminals of the gates 105 and 106 are connected to the output of flip-flop 35″ by cables 115 and 116, respectively. The other input terminal of gates 105 and 106 is connected to the cable 51″ and to one input terminal of gates 50 and 50′ by cables 120 and 120′. An "or" gate 130 is connected across its input side to cables 107 and 108 by cables 131 and 132, the output of this gate being connected to the "reset" terminal of flip-flop 14″ by the cable 40″. The outputs of gates 92 and 93 are connected to the "set" terminals of flip-flops 89 and 90 by cables 140 and 141. The output of flip-flop 89 is connected to one input terminal of gates 99′ and 99″ by cables 142 and 143. The output of flip-flop 90 is connected to one input of gates 99 and 99″ by cables 144 and 145, respectively. The output side of gate 99″ connects to the inhibiting terminal of gate 25″ by a cable 101″. Thus when the second and third codes are too closely interspersed, gates 25′ and 25″ will be blocked by the output from gates 99′ and 99″. Also when the first and third codes are too closely interspersed, gates 25 and 25″ will be blocked by the output from gates 99 and 99″.

It is to be understood that various modifications of the invention other than those above described may be effected by persons skilled in the art without departing from the principle and scope of the invention as defined in the following claims.

What is claimed is:

1. A pulse coded signal separator, having an input circuit adapted to receive a plurality of signals, and a plurality of code separation circuits connected across said input circuit in which; each code separation circuit comprises a clock pulse generator, a coincidence gate connected between said clock pulse generator and said input circuit, clock pulse generator starting means connected to said input circuit and to said clock pulse generator, and code storage means in controlled connection with said coincidence gate; and in which each clock pulse generator starting means comprises a second coincidence gate, one input of said second coincidence gate being connected to said input circuit, a flip-flop connected between said second coincidence gate and said clock pulse generator, and enabling means connected to the other said clock pulse generators in the other said code separation circuits and to the other input of said second coincidence gate for enabling said second coincidence gate during the time intervals between pulses of the other said clock pulse generators; whereby interspersed signals in the input circuit are separately stored in the said code storage means.

2. A pulse coded signal separator as claimed in claim 1 wherein there is provided an inhibiting input gate between said input circuit and the first mentioned coincidence gate and code rejection means connected to the inhibiting input side of said inhibiting input gate and to first mentioned coincidence gate, whereby codes which are too greatly overlapped for resolution are blocked from the said code storage means.

3. A pulse coded signal separator as claimed in claim 2 wherein a delay line is provided between said clock pulse generator and the first mentioned coincidence gate, whereby the input to the register is blocked when the incoming signal does not have a minimum preselected pulse width.

4. A pulse coded signal separator as claimed in claim 3 wherein there is provided a second inhibiting input gate in controlling connection to said flip-flop, a second flip-flop connected between said first mentioned coincidence gate and the inhibiting input of the said second inhibiting input gate and a second delay line connected between the first mentioned delay line and the other input of the said second inhibiting input gate, whereby the said clock pulse generator is stopped when the incoming signal does not have minimum preselected pulse width.

5. A pulse coded signal separator as claimed in claim 4 wherein the said code storage means in each circuit is a stepping register having a stepping input terminal and an additional step output terminal, said input terminal being connected to said clock pulse generator and said additional step output terminal being connected to the first mentioned flip-flop, whereby the said clock pulse generator is stopped and the said register is cleared when bracket coincidence is not secured for the incoming code.

References Cited in the file of this patent

UNITED STATES PATENTS 2,634,052 Bloch ---------------- Apr. 7, 1953